Figure 1A:
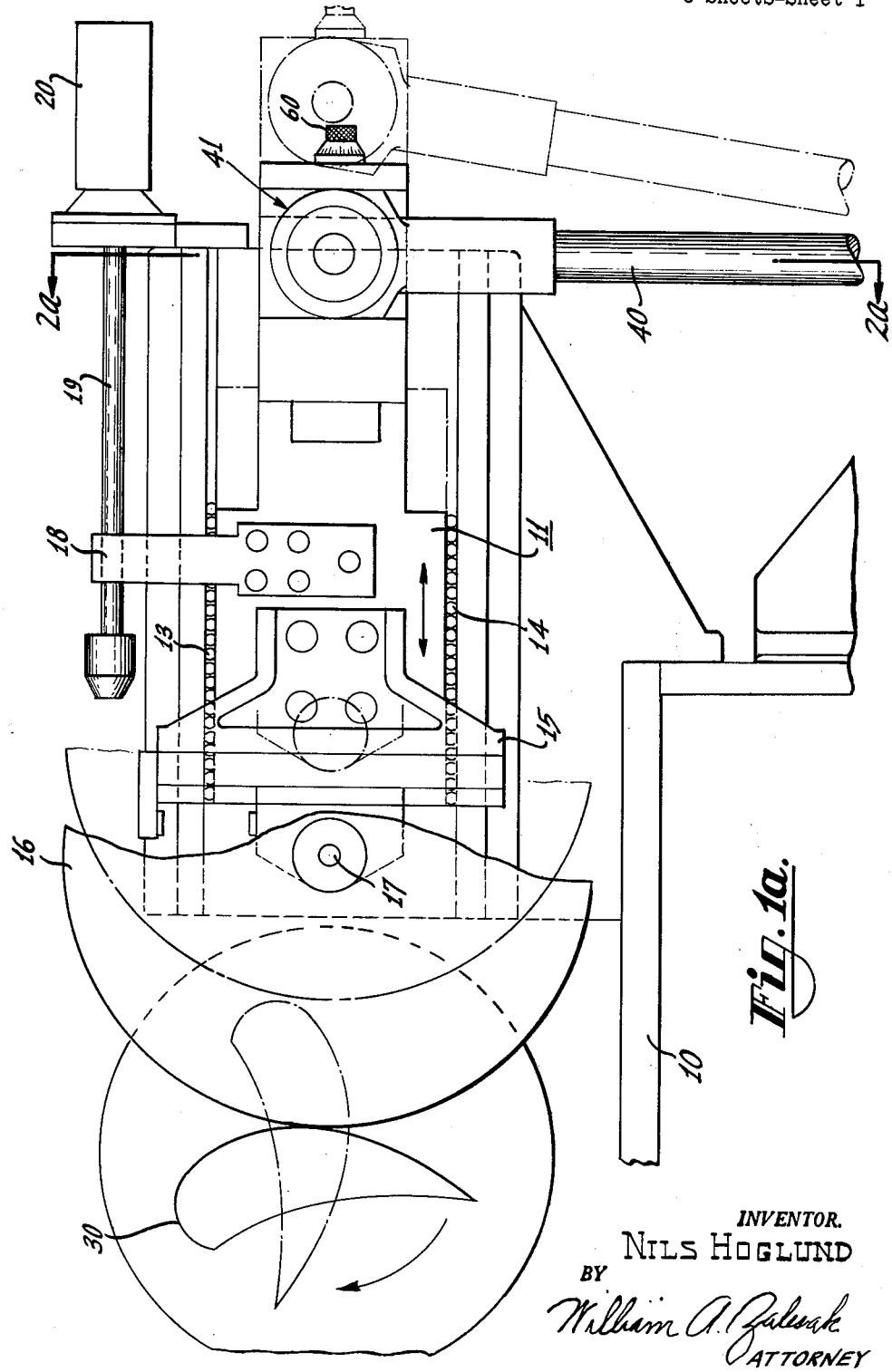

Jan. 12, 1965 N. HOGLUND 3,165,027
APPARATUS FOR FORMING CONTOURS
Filed May 31, 1961 6 Sheets-Sheet 1

INVENTOR.
NILS HOGLUND
BY
William A. Zalesak
ATTORNEY

Jan. 12, 1965  N. HOGLUND  3,165,027
APPARATUS FOR FORMING CONTOURS
Filed May 31, 1961  6 Sheets-Sheet 2

INVENTOR.
NILS HOGLUND
BY
William A. Zalesak
ATTORNEY

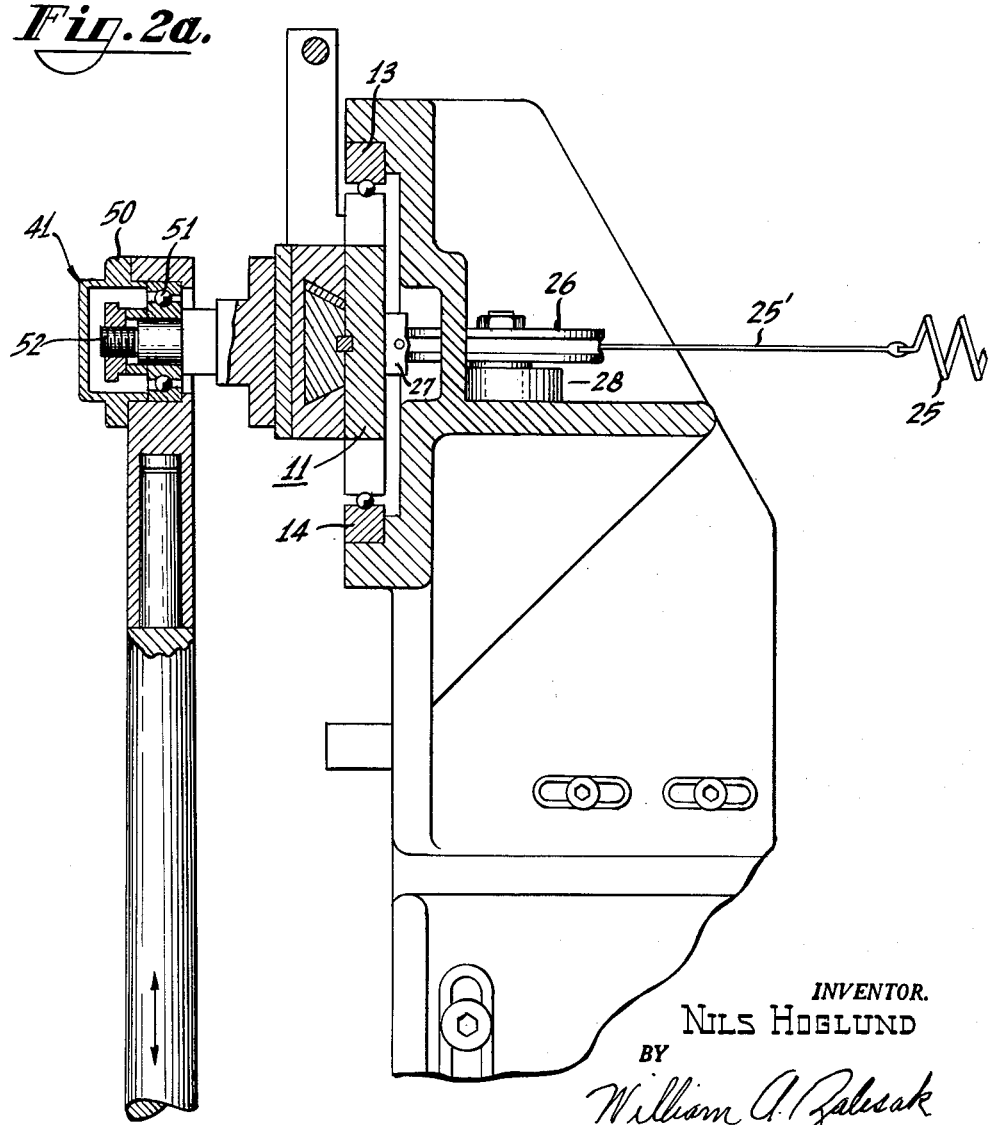

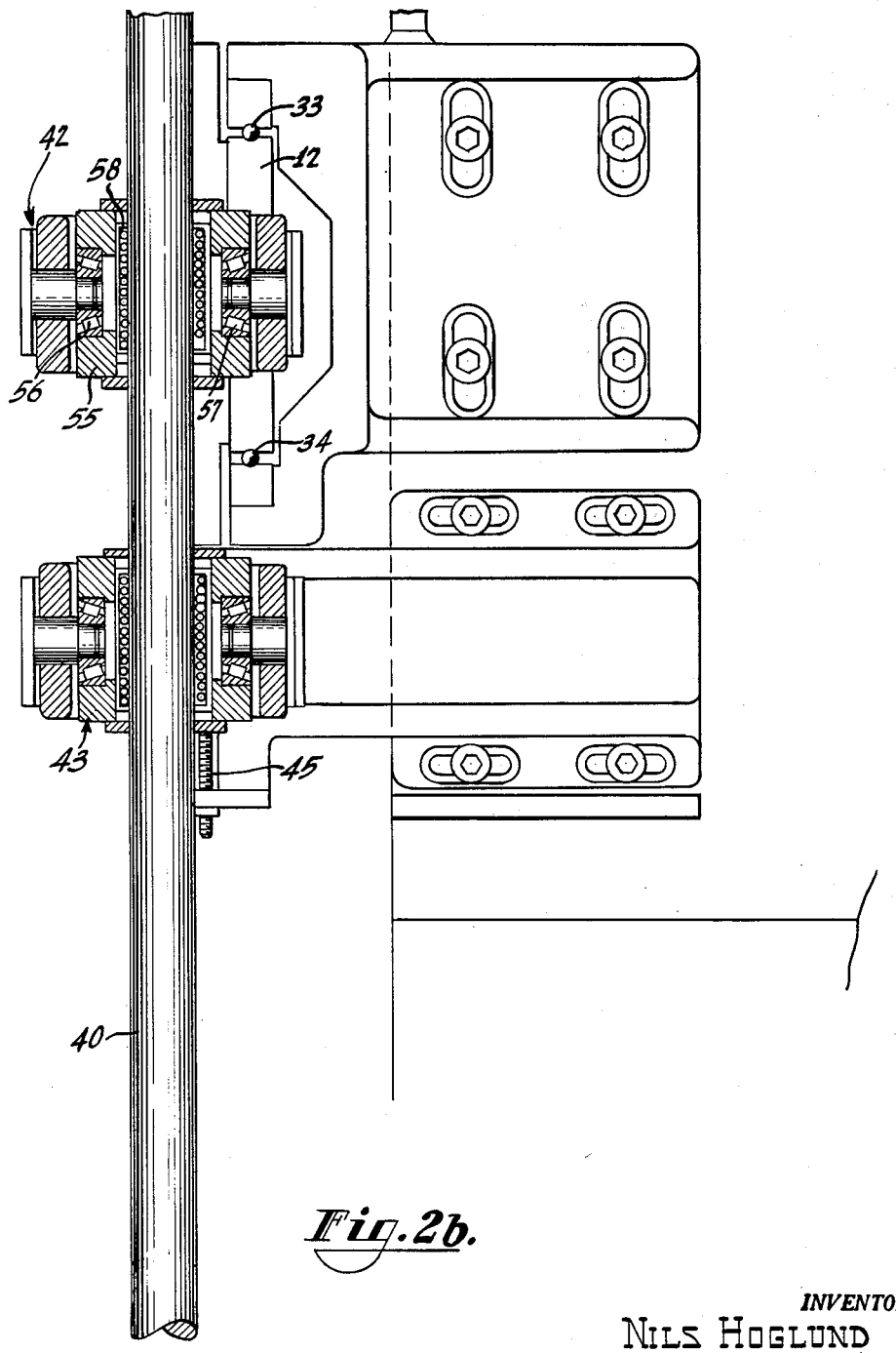

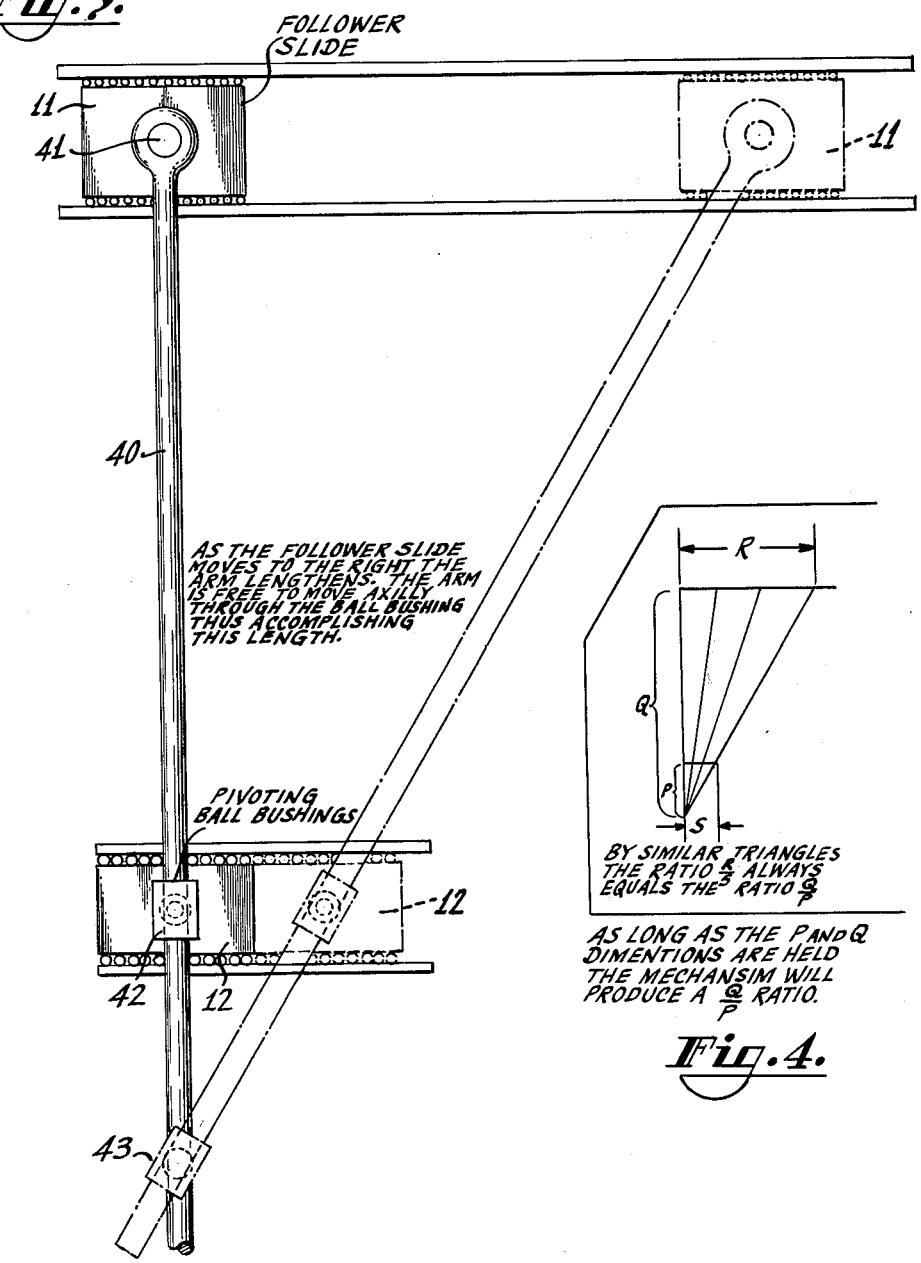

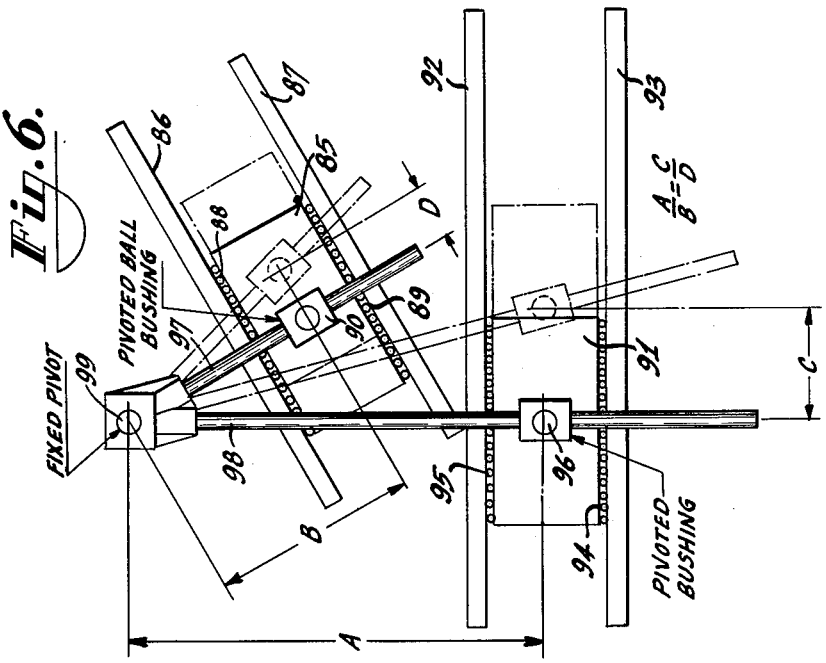
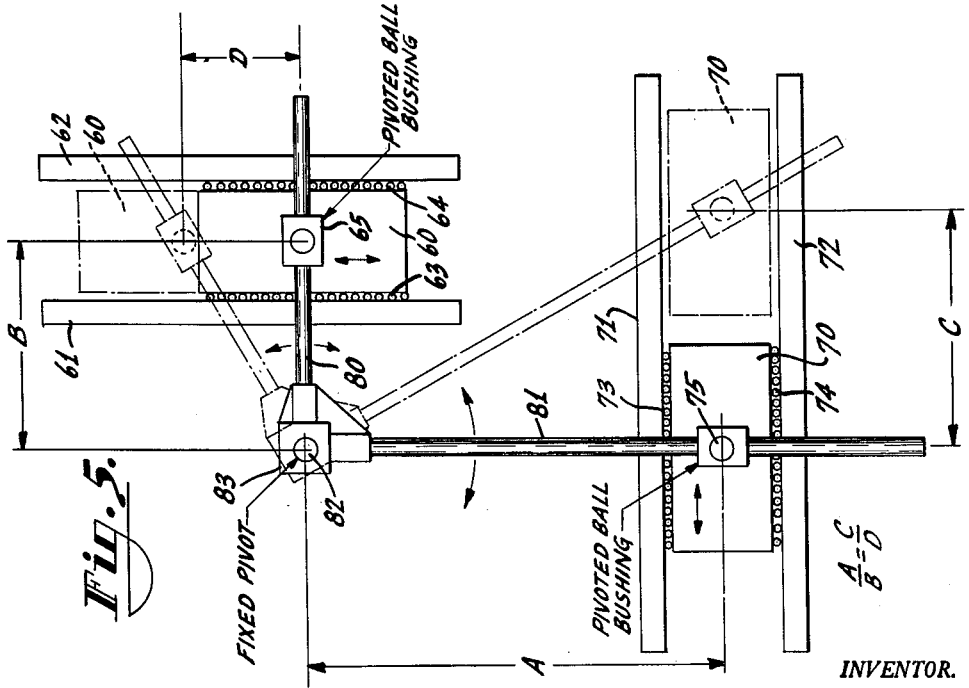

United States Patent Office 3,165,027
Patented Jan. 12, 1965

3,165,027
APPARATUS FOR FORMING CONTOURS
Nils Hoglund, 296 Hartshorn Drive, Short Hills, N.J.
Filed May 31, 1961, Ser. No. 113,707
3 Claims. (Cl. 90—13.3)

My invention relates to apparatus for reproducing a contour from an enlarged contour or master form. More particularly, apparatus in which my invention is incorporated, employs a polar coordinate system giving the same results as a pantograph but eliminating all of the objections of a pantograph arrangement. While not limited thereto, my invention is particularly useful in connection with apparatus utilizing a cutting or forming tool for forming contours on work pieces.

This application is a continuation-in-part of my application Serial No. 35,012 filed June 9, 1960.

In apparatus of the kind described, rigid support is required to avoid vibration which affects accuracy, wear, and smooth operation. It is also desired that ratios between the movement of the template or contour form follower and tool be readily and easily changed. Further, it is desired to prevent tool bind-up.

It is therefore an object of my invention to provide apparatus of the kind described above having rigid support for moving parts, one that is free of vibration, which ensures accuracy, minimizes wear and operates smoothly.

It is a further object of my invention to provide such an apparatus in which ratios of movement between follower and tool can be readily and easily adjusted and in which bind-up is substantially eliminated.

According to one form of my invention, I provide a frame which has mounted thereon a pair of slides movable parallel to each other. One of these slides carries a follower which contacts the master control form. The other slide carries a milling tool which forms a contour on a work piece. The two slides are linked together by means of a linkage one end of which may be pivotally connected to the follower slide which may be spring loaded and pivotally and slidably connected at a second point along its length to the tool slide. A third pivot in which the linkage is slidably supported is mounted on the frame or machine base on which the slides are also mounted. The center pivot may be the fixed pivot and the end pivots slidable. Either of the end pivots can be the fixed pivot. The contour of the master control form is reproduced on a work piece, the work piece and the master form being mounted on spindles which rotate at the same angular velocity. This, in effect, provides a polar coordinate system having mechanical means for transferring the master contour to the work piece. In a modification of apparatus employing my invention, the two slides may be mounted for movement along paths that are at an angle to each other rather than parallel to each other. In this form, the fixed point is the intermediate or center pivot point.

Figure 1B:
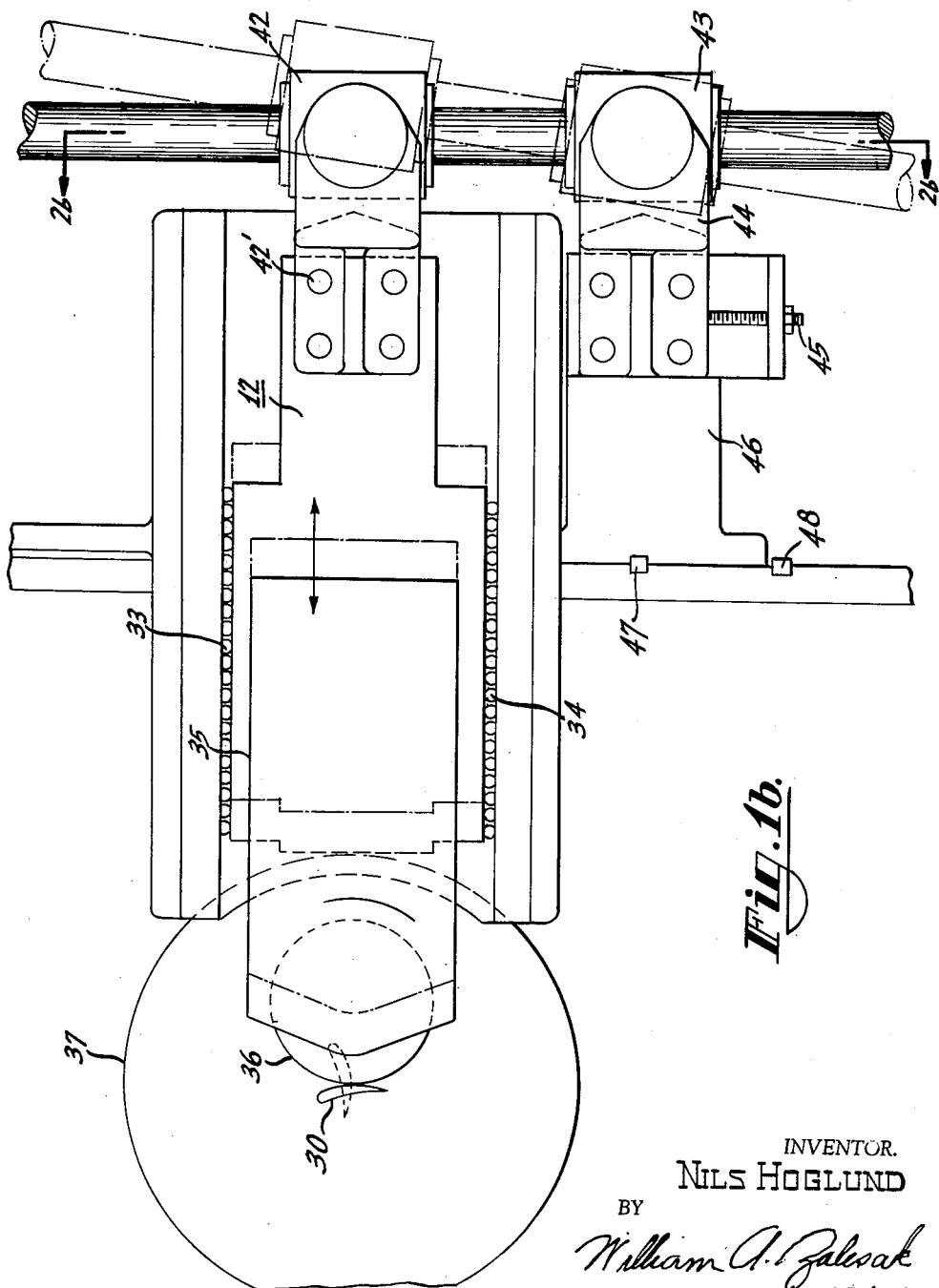

In the drawings:

FIGS. 1a and 1b are side elevations of the apparatus made according to my invention;

FIGS. 2a and 2b are sections taken along the lines 2a—2a, 2b—2b of FIGS. 1a and 1b;

FIGS. 3 and 4 graphically show and explain the ratio relationships of the link and slide mechanisms; and FIGS. 5 and 6 show modifications of apparatus made according to my invention.

Referring to the drawings, I provide a supporting frame or machine base 10 on which are mounted a pair of slides 11 and 12 which move parallel to each other. Slide 11, the follower slide, is mounted in ball bearing assemblies 13 and 14 and has a follower supporting member or bracket 15 mounted thereon. The rotatable follower 16 is mounted on the spindle 17 on bracket 15.

A bracket 18 mounted on slide 11 is fixed to the piston rod 19 mounted in the cylinder 20. The cylinder 20, when operated, is used for retracting the cutting mechanism as well as for lifting the follower off the master form. The slide 11 is spring loaded by means of the spring 25 having a wire 25' passing over pulley 26 and fixed to slide 11 at 27. The pulley is rotatably supported in bearing 28. The spring 25 biases the follower 16 against the master form 30 which is mounted for rotation on the spindle 31.

The tool support slide 12 is mounted in the bearings 33 and 34. Mounted thereon is a tool supporting member or bracket 35 supporting the cutting tool or miller 36. The work piece 30' is mounted for rotation on spindle or work piece holder 37.

Spindles 31 and 37 are rotated at the same angular velocity during operation by a gear train not shown.

To transmit motion from slide 11 to tool slide 12, in the desired ratio of movement, I utilize a link mechanism comprising the link 40 pivotally secured to slide 11 by means of pivot assembly 41 attached to slide 11. The link is pivotally and slidably supported in the pivot mechanism 42 which is connected to slide 12 by bracket 42'. A third pivot assembly 43 secured to frame 10 by bracket 44 pivotally and slidably supports the link and secures it to the frame 10. The bracket 44 may be adjusted vertically by means of adjusting screw 45 mounted in the bracket. This permits adjustment of the lower pivot 43 to change the ratios which will be described below. The supporting bracket 46 may also be adjusted between the positions at 47 and 48.

As shown in FIGS. 2a and 2b, the upper pivot assembly 41 includes a housing 50 in which is mounted the ball bearing assembly 51 which pivotally supports the linkage on the spindle 52 secured to slide member 11. The pivot assembly 42 includes a housing 55 mounted for rotation by means of roller bearings 56 and 57. The bearing assembly 58 permits the link 40 to slide through the housing 55 with a minimum of friction. The bearing assembly 43 is constructed much the same as the bearing assembly 42.

Referring to FIGS. 3 and 4, the mechanism has a ratio of the distances of Q over P. P is the distance from the fixed pivot point of 43 to pivot assembly 42 on slide 12 and Q is the distance from pivot 43 to pivot 41 on slide 11. As the pivot point on 43 is moved so that Q becomes shorter or longer, the ratio is changed accordingly, the ratio in this mechanism being the distances of Q/P. Thus, regardless of the movement of slide 11, the tool movement moves along one side of a triangle and in the same ratio.

The ratios can be varied by shifting the position of the pivot assembly 43 up or down. A micrometer adjustment is provided at 60 to adjust the position of the slide 11 to determine the depth of cut on the work piece on spindle 37.

The above described apparatus has many advantages over mechanism previously used for this type of work. As the slides carrying the cutter head as well as the follower are rigidly supported, they are free of vibration, the ratios can be easily changed by moving the fixed pivot point of pivot assembly 43 up or down either by shifting it from position 47 to 48 or making adjustments inbetween by means of screw 45. Apparatus made according to my invention provides accuracy of design and prevents bind-up during cutting operations.

In FIG. 5 I show a modification of my invention and in which the slides do not move parallel to each other. In the modification there shown, the ratios are retained, however, the slides move at an angle to each other. In this particular modification, slide 60, which could be either the tool slide or the follower slide, is mounted in ball bearing guides 61 and 62 by ball bearing assemblies 63 and 64. A pivoted ball bushing assembly 65 is mounted on the slide 60. The other slide 70 which is mounted on ball bearing guides 71 and 72 by means of ball bushing assemblies 73 and 74 is provided with a pivoted ball bearing bushing 75. The link mechanism in this modification includes the elongated rod-like elements 80, 81 which are fixed together to pivot about the point 82 by means of the angle bracket 83. This bracket can be fixed to the frame. The rod links 80 and 81 are slidably mounted in the pivoted ball bushings 65 and 75, respectively.

It will be obvious that the ratio of movements is set forth in the equation $A/B = C/D$. By moving the pivot point 82 vertically or horizontally, the ratios of the link mechanism between the points 83, 65 and 83, 75 can be changed to change the ratios of $A/B = C/D$ to obtain the desired ratio. It is also obvious that either of the two slides 60 or 70 could be the tool or follower slide.

In FIG. 6 I show a still further modification of the device shown in FIG. 5. In this arrangement, however, instead of a 90° relationship between the paths of the two slides, I show a different angle. However, in other respects the two arrangements are similar.

As shown in FIG. 6, slide 85 is mounted in ball bearing guides 86, 87 by means of ball bushing assemblies 88, 89. This slide is provided with a pivoted ball bushing assembly 90. The slide 91 is mounted on ball bearing guides 92, 93 by means of ball bushing assemblies 94, 95, the slide being provided with a pivoted ball bushing assembly 96. The link mechanism includes the rods 97 and 98 pivoted at 99 by means of the bracket 100 to which they are fixed. The link rods 97 and 98 are slidably mounted in the pivoted assemblies 90 and 96. The relationships of the movements of the slides is again indicated by the formula $A/B = C/D$.

What is claimed is:

1. Apparatus for transferring a contour from a rotatably mounted master form to a work piece mounted to rotate at the same angular velocity as said master form, including a rotatable master form, a stationary rigid support frame, a follower slide movably mounted on said support frame and continously biased toward said master form, a follower mounted on said follower slide in contact with said master form, a tool slide mounted on said stationary rigid support frame and movable parallel to said follower slide, a tool thereon, said tool slide being movable toward and from said work piece, a link mechanism having a pivotal connection to each of said slides and said frame and being slidably mounted with respect to two of the pivotal connections, the other of the pivotal connections being fixed.

2. Apparatus employing a polar coordinate system for transferring an enlarged master contour to a work piece wherein a master form and a work piece are rotated at the same angular velocity and wherein the radial distance of a follower and a cutting tool are held at a fixed ratio, said apparatus comprising a stationary rigid support frame, a first slide mounted for reciprocal linear movement on said stationary rigid support frame and supporting thereon a follower for engaging said enlarged master form, a second slide mounted for reciprocal linear movement on said stationary rigid support frame parallel to said movement of said first slide and supporting a tool thereon, a link mechanism having one end pivotally fixed to one of said slides and pivotally and slidably supported on the other of said slides, and a third pivoted support having a slidable engagement with said link mechanism, adjustable means interconnecting said third pivoted support and said stationary rigid support frame for selective positioning of said third pivoted support relative to said stationary rigid support frame in a direction generally perpendicular to the movement of said slides whereby the position of the third pivot is adjustable relatively to the length of said mechanism whereby the ratio of movements of said slides may be varied prior to each cutting operation, and means interconnecting said stationary rigid support frame and engaging said first slide for biasing said follower toward the master contour.

3. The invention defined in claim 1 wherein the pivotal connection of the link mechanism to the frame is the fixed pivotal connection.

References Cited in the file of this patent
UNITED STATES PATENTS

| | | |
|---|---|---|
| 1,604,883 | Deve | Oct. 26, 1926 |
| 1,795,887 | Quattrocchi | Mar. 10, 1931 |
| 2,069,189 | Taylor | Jan. 26, 1937 |
| 2,353,874 | Buchanan | July 18, 1944 |